United States Patent
Chen

(10) Patent No.: US 10,223,559 B1
(45) Date of Patent: Mar. 5, 2019

(54) TOMBSTONE INFORMATION SYSTEM

(71) Applicant: Frank Chen, San Marino, CA (US)

(72) Inventor: Frank Chen, San Marino, CA (US)

( * ) Notice: Subject to any disclaimer, the term of this patent is extended or adjusted under 35 U.S.C. 154(b) by 202 days.

(21) Appl. No.: 15/396,916

(22) Filed: Jan. 3, 2017

(51) Int. Cl.
- *G06K 7/10* (2006.01)
- *G06K 7/14* (2006.01)
- *G06F 17/30* (2006.01)
- *G06K 19/06* (2006.01)

(52) U.S. Cl.
CPC ... *G06K 7/10722* (2013.01); *G06F 17/30058* (2013.01); *G06K 7/1417* (2013.01); *G06K 19/06037* (2013.01)

(58) Field of Classification Search
USPC .......................................................... 235/375
See application file for complete search history.

(56) References Cited

U.S. PATENT DOCUMENTS

| | | | |
|---|---|---|---|
| 7,395,960 | B1 | 7/2008 | Toothman, III |
| 8,234,251 | B2 | 7/2012 | Mindrum |
| D683,105 | S | 5/2013 | Victor |
| 8,909,670 | B2 | 12/2014 | Neal |
| 9,053,198 | B2 | 6/2015 | Harrison |
| 2010/0008076 | A1* | 1/2010 | Elam ..................... E04H 13/003 362/183 |
| 2013/0151554 | A1* | 6/2013 | Neal ................. G06F 17/30277 707/769 |
| 2014/0136996 | A1* | 5/2014 | Boozer .................. G06Q 10/00 715/753 |
| 2014/0218519 | A1 | 8/2014 | Borovinov |
| 2017/0109621 | A1* | 4/2017 | Brown .................. E04H 13/003 |

FOREIGN PATENT DOCUMENTS

WO      2013053004 A1      4/2013

* cited by examiner

*Primary Examiner* — Michael G Lee
*Assistant Examiner* — David Tardif

(57) ABSTRACT

The tombstone information system is an electronic reliquary that is adapted for use with a tombstone or other funerary marker. The tombstone information system is a memorial device that delivers an encomium of the life of the decedent. The tombstone information system comprises a marker, one or more encomia and a memorial database. The marker is a placard that conveys the index information required to identify and access the encomium associated with the decedent. The memorial database is a data storage device that stores and retrieves the encomium for delivery and display. The memorial database stores and manages one or more encomia. Each encomium selected from the one or more encomia comprises a eulogy, the vital statistics, and references to other relevant information regarding the decedent.

13 Claims, 4 Drawing Sheets

TOMBSTONE INFORMATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of buildings and structures such as monuments, tombs, burial vaults, or columbaria, more specifically, a funeral marker or other accessory not a part of the vault.

SUMMARY OF INVENTION

The tombstone information system is an electronic reliquary that is adapted for use with a tombstone or other funerary marker. The tombstone information system is a memorial device that delivers an encomium of the life of the decedent. The tombstone information system comprises a marker, one or more encomia and a memorial database. The marker is a placard that conveys the index information required to identify and access the encomium associated with the decedent. The memorial database is a data storage device that stores and retrieves the encomium for delivery and display. The memorial database stores and manages one or more encomia. Each encomium selected from the one or more encomia comprises a eulogy, the vital statistics, and references to other relevant information regarding the decedent.

These together with additional objects, features and advantages of the tombstone information system will be readily apparent to those of ordinary skill in the art upon reading the following detailed description of the presently preferred, but nonetheless illustrative, embodiments when taken in conjunction with the accompanying drawings.

In this respect, before explaining the current embodiments of the tombstone information system in detail, it is to be understood that the tombstone information system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tombstone information system.

It is therefore important that the claims be regarded as including such equivalent construction insofar as they do not depart from the spirit and scope of the tombstone information system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
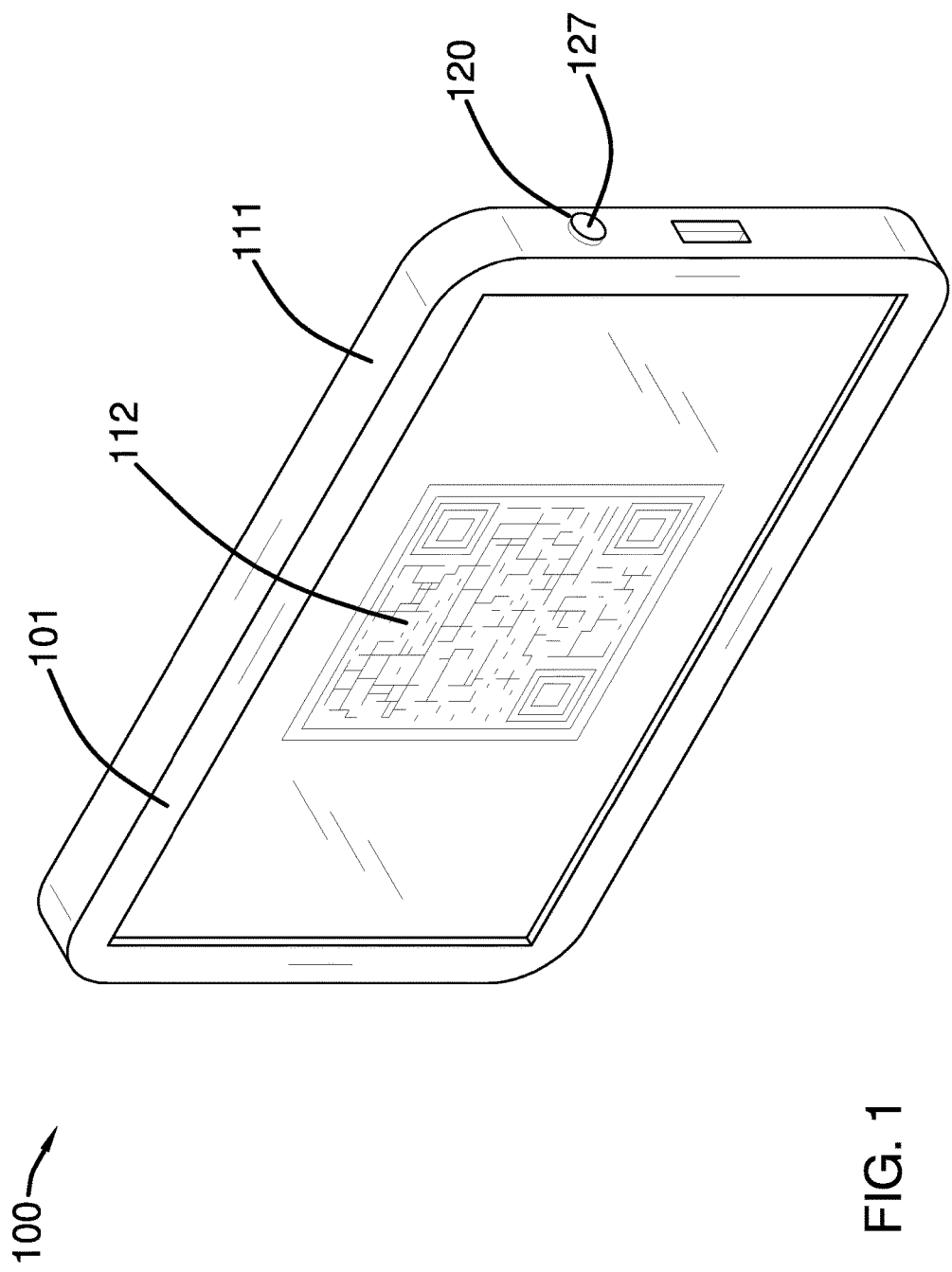
FIG. 1 is a front perspective view of an embodiment of the disclosure.
Figure 2:
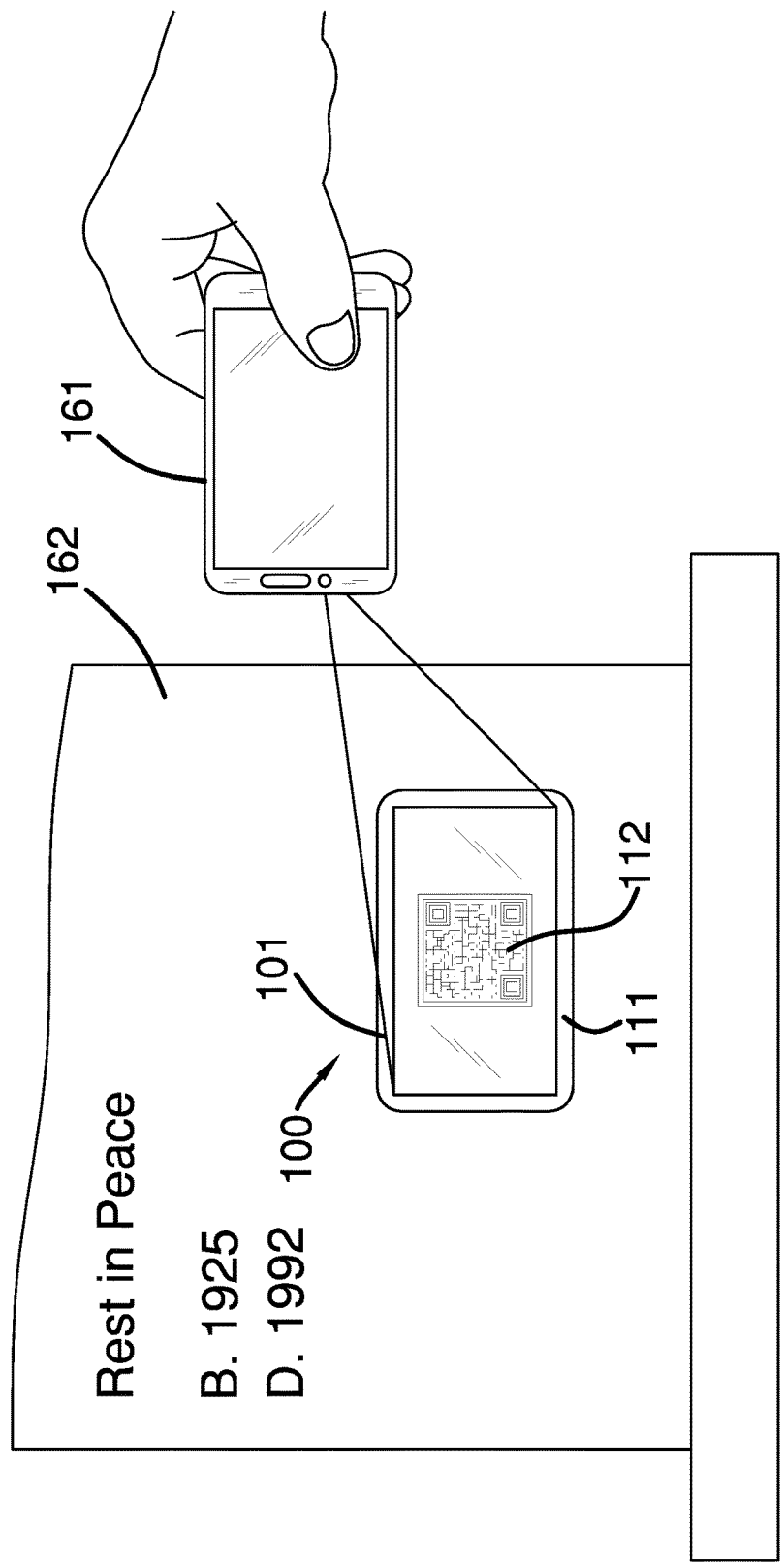
FIG. 2 is an in use view of an embodiment of the disclosure.
Figure 3:
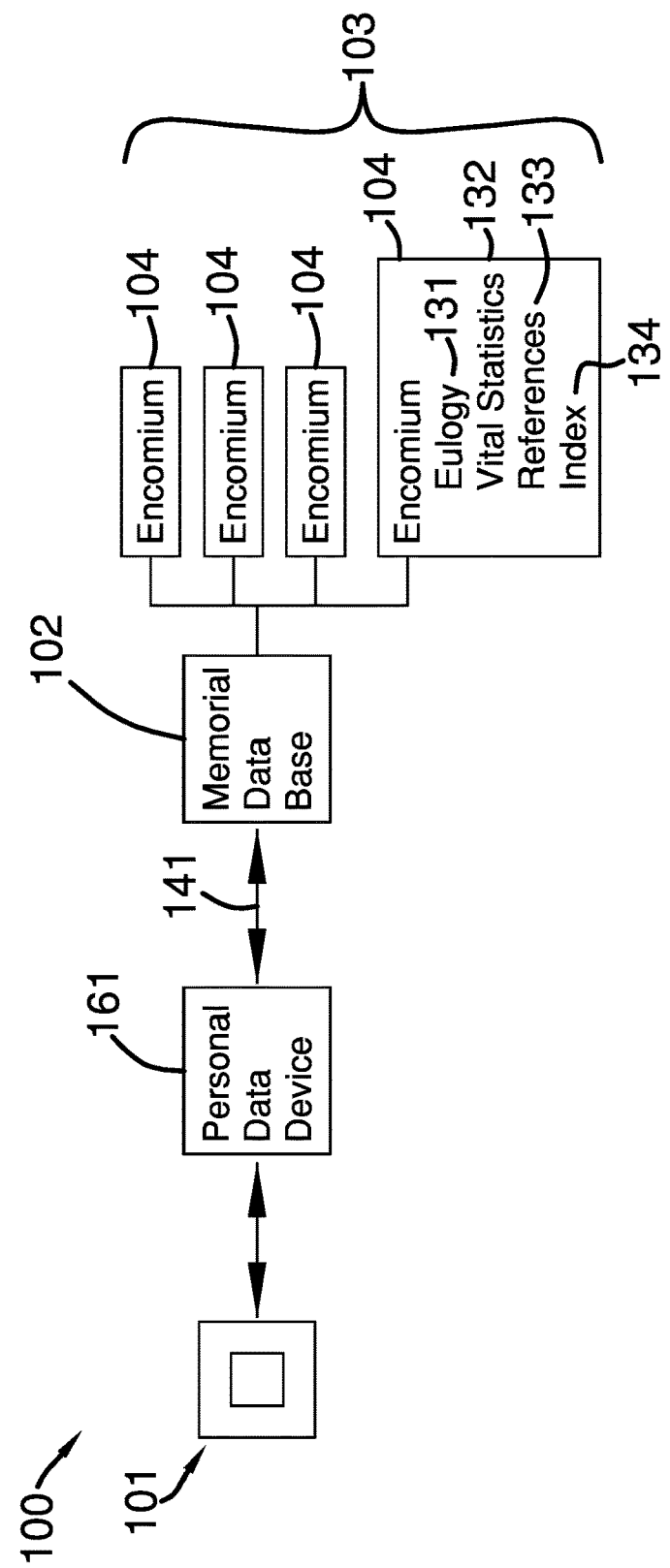
FIG. 3 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

The tombstone information system 100 (hereinafter invention) comprises a marker 101, one or more encomia 103 and a memorial database 102. The marker 101 is a placard that conveys the index information 134 required to identify and access the encomium 104 associated with the decedent. The memorial database 102 is a data storage device that stores and retrieves the encomium 104 for delivery and display. The memorial database 102 stores and manages one or more encomia 103. Each encomium 104 selected from the one or more encomia 103 comprises a eulogy 131, the vital statistics 132, and references 133 to other relevant information regarding the decedent. The invention 100 is an electronic reliquary that is adapted for use with a tombstone 162 or other funerary marker. The invention 100 is adapted for use with a decedent. The invention 100 is a memorial device that delivers an encomium 104 of the life of the decedent.

Each of the one or more encomia 103 further comprises a eulogy 131, vital statistics 132, and references 133. The eulogy 131 is an audiovisual presentation of a remembrance of the decedent associated with the encomium 104. The vital statistics 132 is a summary of the basic genealogical information associated with the decedent. The vital statistics 132 can be presented separately or incorporated as a part of the eulogy 131. The references 133 is information identifying documents, such as a universal resource locator, where additional information about the decedent may be found. The references 133 may be presented separately or incorporated as a part of the eulogy 131 or the vital statistics 132.

The memorial database 102 is a commercially available automated electronic device that stores a digitally encoded representation of each of the one or more encomia 103. When properly queried by the marker 101 or some other appropriate device, the memorial database 102 will retrieve the selected encomium 104 from the one or more encomia 103 and transmit the requested encomium 104 to the requesting device.

In the first potential embodiment of the disclosure, the marker 101 is adapted for use with a personal data device 161. The marker 101 further comprises a memorial housing 111 and a two dimensional marketing code 112. The memorial housing 111 is a structure that is attached to the tombstone 162. The purpose of the memorial housing 111 is to: 1) invoke the memory of the decedent for a visitor to the tombstone 162; and, 2) to present for use by the visitor the two dimensional marketing code 112. The two dimensional marketing code 112 is a machine readable representation of the index information 134 that associates the decedent memorialized by the tombstone 162 to the specific encomium 104 among the one or more encomia 103 stored by the memorial database 102. The two dimensional marketing code 112 is selected such that the information encoded by the two dimensional marketing code 112 is readily decoded and processed by existing applications contained within the personal data device 161. It is preferred that the memorial housing 111 be formed from stainless steel. It is preferred that the two dimensional marketing code 112 be engraved or otherwise incorporated into a ceramic material. These preferred materials are selected because of their robust performance in extreme weather conditions. It is preferred that the two dimensional marketing code 112 be a QR code.

To use the first potential embodiment of the disclosure, the visitor scans the two-dimensional marketing code 112 into a personal data device 161. The personal data device 161 decodes the two dimensional marketing code 112 to determine a universal resource locator and the index information 134 associated with the decedent. The personal data device 161 then uses the universal resource locator and a commercially available data connection to connect to the memorial database 102. The personal data device 161 then queries the memorial database 102 using the index information 134 to retrieve and download the encomium 104 associated with the decedent. Once the encomium 104 is downloaded, the personal data device 161 will present the encomium 104 to the visitor for review and viewing. The functions required within the personal data device 161 to perform the functions described in this paragraph are commonly available in personal data devices 161.

A second potential embodiment of the disclosure extends the first potential embodiment of the disclosure such that the marker 101 further comprises a control system 120. The control system 120 presents the encomium 104 associated with the decedent at the tombstone 162 without requiring a personal data device 161. In this scenario, the control system 120 is stored within the memorial housing 111.

The control system 120 comprises a logic module 121, a communication module 122, a video output 123, a speaker 124, a photovoltaic cell 125, a battery 126, a switch 127, a limit resistor 128, and a diode 129. The logic module, the communication module 122, the video output 123, the speaker 124, the photovoltaic cell 125, the battery 126, the switch 127, the limit resistor 128, and the diode 129 are electrically interconnected.

Figure 4:
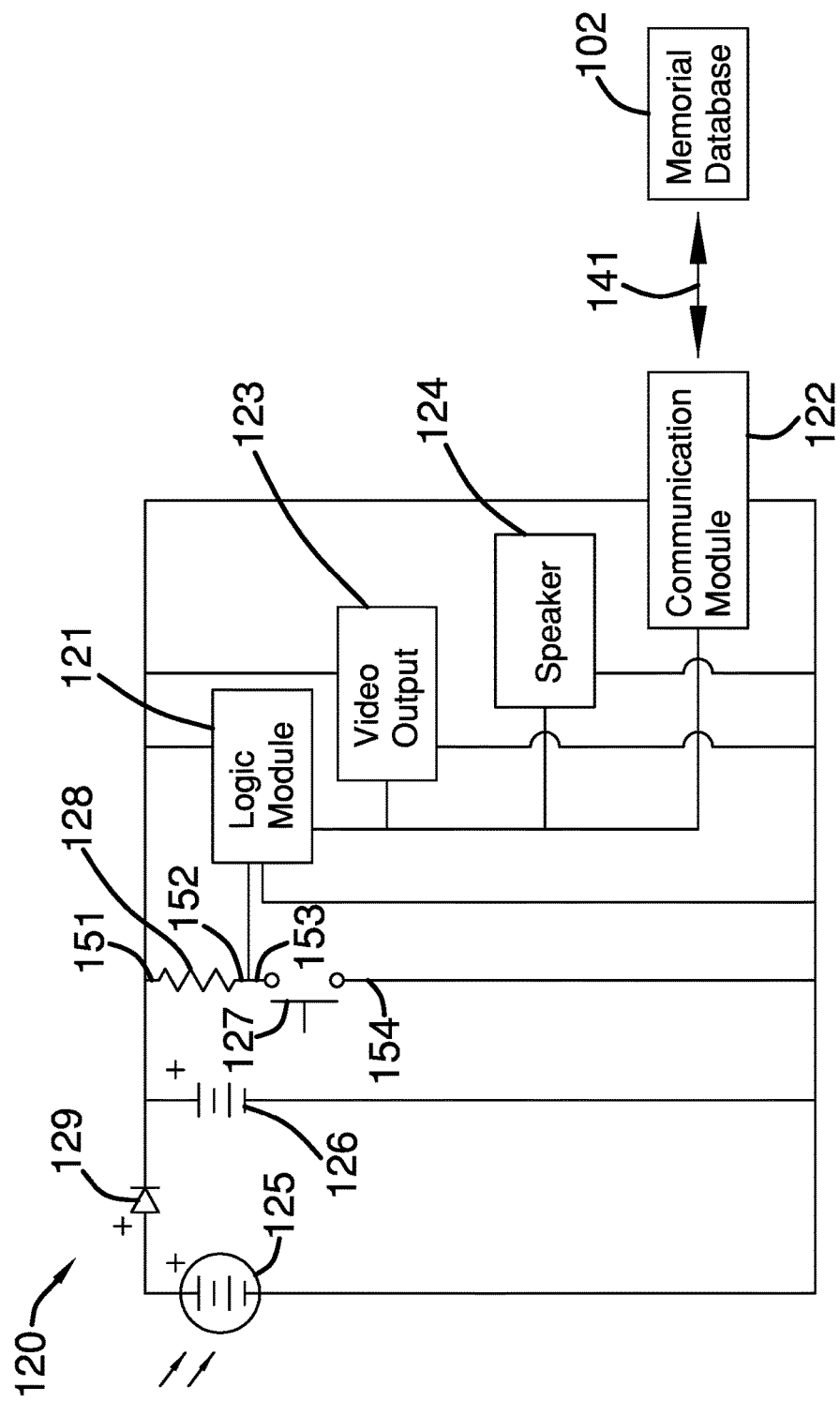
FIG. 4 is a schematic view of an embodiment of the disclosure.

The logic module 121 is a programmable electronic device that is used to control and operate the control system 120. The communication module 122 is a readily and commercially available wireless electronic communication device that allows the logic module 121 to communicate with the memorial database 102 using a wireless functionality 141. In the second potential embodiment of the disclosure, the wireless functionality 141 of the communication module 122 is selected from the group consisting of: 1) a commercially available wireless cellular data connection provides the wireless functionality 141 that connects to the memorial database 102 using the universal resource locator; or, 2) a local wireless network, such as an IEEE 802.11 functionality, provides the wireless functionality 141 that connects the control system 120 directly to the memorial database 102. The logic module 121 uses the communication module 122 to download the encomium 104 associated with the decedent from the memorial database 102 for use by the logic module 121. Once the encomium 104 is downloaded, the logic module 121 prepares and presents the encomium 104 to a visitor using the video output 123 and the speaker 124. The video output 123 is a readily and commercially available display device that is used to present visual images to the visitor. The speaker 124 is a readily and commercially available electrical device that is used to present any audio components of the encomium 104. As shown in FIG. 4, the switch 127 a normally open momentary switch that is used by the visitor to provide an initiation signal to the logic module 121 that initiates the downloading of the encomium 104. The switch 127 is further defined with a third lead 153 and a fourth lead 154. The limit resistor 128 is further defined with a first lead 151 and a second lead 152. The limit resistor 128 is placed in series with the switch 127 for the purpose of limiting the flow of electric current through the switch 127. The control system 120 is powered using the battery 126, the photovoltaic cell 125, and the diode 129. The battery 126 is a commercially available battery. The chemical energy stored within the battery 126 is renewed and restored through use of the photovoltaic cell 125. The photovoltaic cell 125 is a readily and commercially available The photovoltaic cell 125 is an electrical device that reverses the polarity of the battery 126 and provides the energy necessary to reverse the chemical processes that the battery 126 initially used to generate the electrical energy. This reversal of the chemical process creates a chemical potential energy that will later be used to generate electricity from the battery 126. As shown in FIG. 4, the diode 129 prevents the battery 126 from discharging into the photovoltaic cell 125.

In the second potential embodiment of the disclosure, the positive terminal of the photovoltaic cell 125 is electrically connected to the positive terminal of the diode 129. The positive terminal of the battery 126 is electrically connected to the negative terminal of the diode 129. The positive terminal of the battery 126 is electrically connected to a first lead 151 of the limit resistor 128. The second lead 152 of the limit resistor 128 is electrically connected to a third lead 153 of the switch 127. The second lead 152 of the limit resistor 128 is electrically connected to the logic module 121. The fourth lead 154 of the switch 127 is electrically connected to the negative terminal of the battery 126. The fourth lead 154 of the switch 127 is electrically connected to the negative terminal of the photovoltaic cell 125. The positive terminal of the battery 126 is further electrically connected to provide power to the logic module 121, the communication module 122, the video output 123, and the speaker 124.

In the second potential embodiment of the disclosure, when the switch 127 is closed, the logic module 121 downloads the encomium 104 associated with the decedent and presents the encomium 104 to the visitor using the video output 123 and the speaker 124. As a part of the references 133, the encomium 104 will present on the video output 123 a visual representation of the two-dimensional marketing code 112 that the visitor can read using a personal data device 161. As in the first potential embodiment of the disclosure, the two dimensional marketing code 112 provides the personal data device 161 with the universal resource locator and the index information 134 required to locate and download the encomium 104 for later use as described in the first potential embodiment of the disclosure.

The following definitions were used in this disclosure:

Battery: As used in this disclosure, a battery is a container consisting of one or more cells, in which chemical energy is converted into electricity and used as a source of power.

Diode: As used in this disclosure, a diode is a two terminal semiconductor device that allows current flow in only one direction.

Display: As used in this disclosure, a display is a surface upon which is projected an image, potentially including, but not limited to, graphic images and text, that is interpretable by an individual viewing the projected image in a meaningful manner.

Logic Module: As used in this disclosure, a logic module is an electrical device that is programmable and that accepts digital and analog inputs, processes the digital and analog inputs according to previously stored instruction and to provide the results of these instructions as digital or analog outputs.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. So for example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Personal Data Device: As used in this disclosure, a personal data device is a handheld device that is used for managing personal information and communication. Examples of personal data device include, but are not limited to, cellular phones, tablets and smart phones.

Photovoltaic Cell: As used in this disclosure, a photovoltaic cell is an electrical device that directly converts light energy into electrical energy.

Speaker: As used in this disclosure, a speaker is a transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Two Dimensional Marketing Code: As used in this disclosure, a two dimensional marketing code is a machine readable coding scheme that is: 1) readily available through the public domain or a free licensing arrangement; 2) consists of an array of black or white squares; 3) is coded to direct the machine reading the two dimensional marketing code to an information resource, such as a web site, for information related to the two dimensional marketing code.

The following definition was used in this disclosure:

The following definitions and directional references were used in this disclosure:

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electronic reliquary comprising:
a marker, an encomium, and a memorial database;
wherein the electronic reliquary is adapted for use with a decedent;
wherein the electronic reliquary is adapted for use with a tombstone;
wherein the electronic reliquary is a memorial device that delivers an encomium of the life of the decedent;
wherein the marker displays index information about the encomium;
wherein the memorial database is a data storage device that stores and retrieves the encomium for delivery and display;
wherein the memorial database stores and manages one or more encomia;
wherein each encomium selected from the one or more encomia comprises a eulogy, vital statistics, and one or more references regarding the decedent required to access the encomiums;
wherein the eulogy is an audiovisual presentation regarding the decedent associated with the encomium;
wherein the vital statistics is a summary of the basic genealogical information associated with the decedent;
wherein the references is information regarding the location of additional information about the decedent;
wherein the memorial database automated electronic device;
wherein the memorial database stores a digitally encoded representation of each of the one or more encomia;
wherein the memorial database retrieves an encomium selected from the one or more encomia;
wherein the marker further comprises a memorial housing;
wherein the memorial housing is a structure that is attached to the tombstone;
wherein the marker further comprises a control system and a two dimensional marketing code;
wherein the control system presents the encomium associated with the decedent at the tombstone;
wherein the control system displays the two dimensional marketing code;

wherein the control system is stored within the memorial housing;

wherein the control system comprises a logic module, a communication module, a video output, a speaker, a photovoltaic cell, a battery, a switch, a limit resistor, and a diode;

wherein the logic module, the communication module, the video output, the speaker, the photovoltaic cell, the battery, the switch, the limit resistor, and the diode are electrically interconnected;

wherein the logic module is a programmable electronic device;

wherein the communication module is a wireless electronic communication device;

wherein the communication module manages communication between logic module and the memorial database using a wireless functionality.

2. The electronic reliquary according to claim 1
wherein the marker is adapted for use with a personal data device;
wherein the memorial database transmits the selected encomium to the personal data device.

3. The electronic reliquary according to claim 2
wherein the marker further comprises a memorial housing and a two dimensional marketing code;
wherein the memorial housing is a structure that is attached to the tombstone;
wherein the memorial housing presents the two dimensional marketing code for use.

4. The electronic reliquary according to claim 3
wherein the two dimensional marketing code is a machine readable representation of the index information that associates the decedent memorialized by the tombstone to the specific encomium among the one or more encomia stored by the memorial database;
wherein the two dimensional marketing code is scanned into the personal data device;
wherein the personal data device decodes the two dimensional marketing code to determine a universal resource locator and the index information associated with the decedent;
wherein the personal data device then uses the universal resource locator and a commercially available data connection to connect to the memorial database;
wherein the personal data device queries the memorial database using the index information to retrieve and download the encomium associated with the decedent;
wherein the personal data device presents the encomium.

5. The electronic reliquary according to claim 4 wherein the memorial housing be formed from stainless steel.

6. The electronic reliquary according to claim 5 wherein it the two dimensional marketing code is incorporated into a ceramic material.

7. The electronic reliquary according to claim 1 wherein the wireless functionality of the communication module is selected from the group consisting of: 1) a wireless cellular data connection; or, 2) a local wireless network.

8. The electronic reliquary according to claim 7
wherein the logic module uses the communication module to download the encomium associated with the decedent from the memorial database;
wherein the logic module presents the encomium using the video output and the speaker.

9. The electronic reliquary according to claim 8
wherein the switch a normally open momentary switch;
wherein the switch is further defined with a third lead and a fourth lead;
wherein the limit resistor is further defined with a first lead and a second lead;
wherein the limit resistor is placed in series with the switch;
wherein the control system is powered using the battery, the photovoltaic cell, and the diode;
wherein the diode prevents the battery from discharging into the photovoltaic cell.

10. The electronic reliquary according to claim 9
wherein the positive terminal of the photovoltaic cell is electrically connected to the positive terminal of the diode;
wherein the positive terminal of the battery is electrically connected to the negative terminal of the diode;
wherein the positive terminal of the battery is electrically connected to a first lead of the limit resistor;
wherein the second lead of the limit resistor is electrically connected to a third lead of the switch;
wherein the second lead of the limit resistor is electrically connected to the logic module;
wherein the fourth lead of the switch is electrically connected to the negative terminal of the battery;
wherein the fourth lead of the switch is electrically connected to the negative terminal of the photovoltaic cell;
wherein the positive terminal of the battery is further electrically connected to provide power to the logic module, the communication module, the video output, and the speaker.

11. The electronic reliquary according to claim 10
wherein the electronic reliquary is adapted for use with a personal data device;
wherein the two dimensional marketing code is a machine readable representation of the index information that associates the decedent memorialized by the tombstone to the specific encomium among the one or more encomia stored by the memorial database;
wherein the two dimensional marketing code is presented as part of the presentation of the encomium;
wherein the two dimensional marketing code is scanned into the personal data device;
wherein the personal data device decodes the two dimensional marketing code to determine a universal resource locator and the index information associated with the decedent;
wherein the personal data device then uses the universal resource locator and a commercially available data connection to connect to the memorial database;
wherein the personal data device queries the memorial database using the index information to retrieve and download the encomium associated with the decedent;
wherein the personal data device presents the encomium.

12. The electronic reliquary according to claim 11 wherein the memorial housing be formed from stainless steel.

13. The electronic reliquary according to claim 12 wherein it the two dimensional marketing code is incorporated into a ceramic material.

* * * * *